United States Patent Office 3,299,249
Patented Jan. 17, 1967

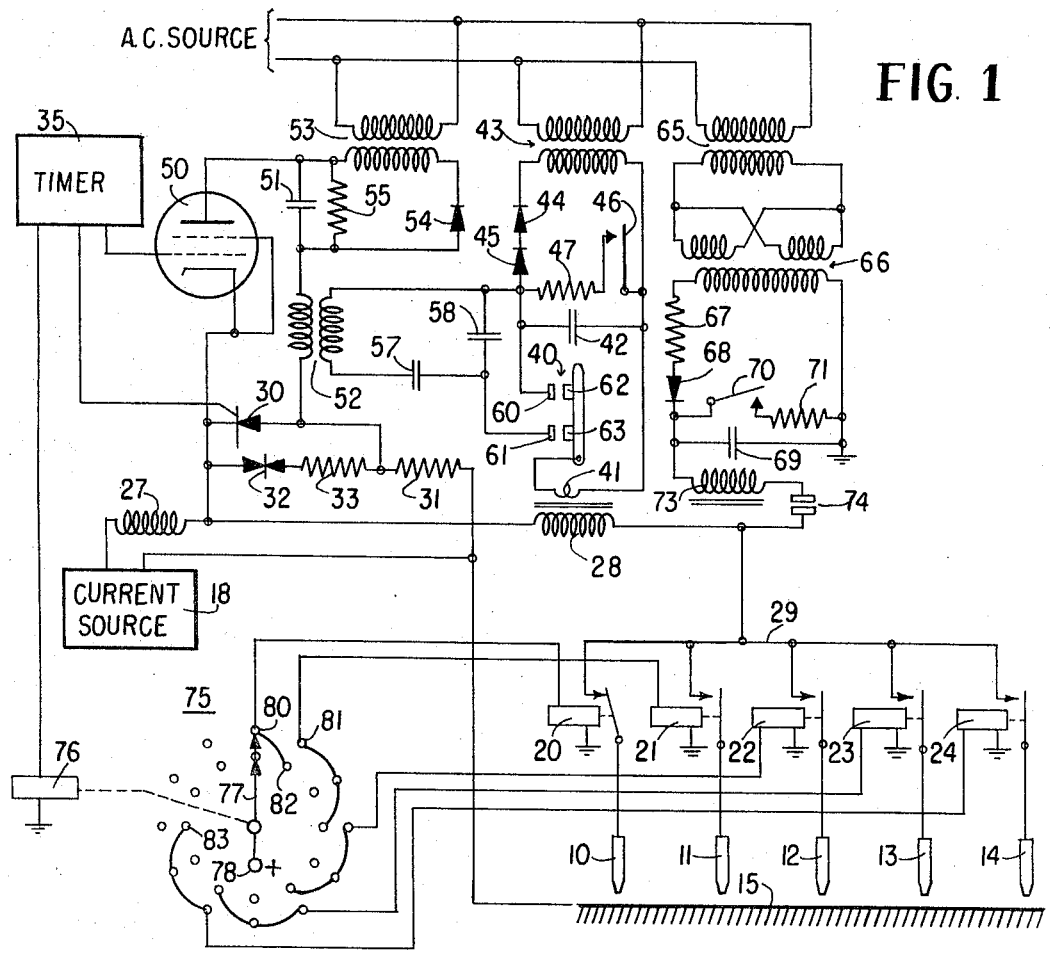

3,299,249
WELDING SYSTEM
Albert M. Sciaky, Palos Park, Ill., assignor to Welding Research, Inc., Chicago, Ill., a corporation of Illinois
Filed Mar. 4, 1964, Ser. No. 349,270
8 Claims. (Cl. 219—131)

This invention relates generally to welding systems, and more particularly to a multiple torch spot welding system wherein a plurality of torches are energized from a single current supply circuit.

Spot welding is used in many applications for uniting metals, such as in the construction of automobiles. In order to provide a weld having predetermined characteristics, it is necessary that the welding of each spot be accurately controlled as to current applied and the duration of the welding arc. A system for initiating an arc at a precise time so that the duration of the arc is accurately controlled is described and claimed in application Serial No. 227,481, filed October 1, 1962, now Patent No. 3,154,721, by Marcell R. Sommeria, and assigned to the assignee of the present application.

In the welding of many objects, it is necessary to provide a plurality of spot welds. This can be accomplished by moving the welding torch or the object from one position to another, or by use of a plurality of welding torches positioned to provide welds at the desired points. To provide a plurality of torches with individual energizing circuits therefor results in complex and expensive equipment. However, the use of a single energizing circuit presents a problem as the welding currents used may be quite large and it is, therefore, difficult to switch from one torch to another. The use of a single energizing circuit is also complicated by the fact that the welding arc must be initiated each time a different torch is switched into the circuit, and the arc must be started at a precise time so that the duration of the welding arc at each of the various torches is accurately controlled.

It is, therefore, an object of the present invention to provide a simple and efficient circuit for energizing a pluralitiy of welding torches.

Another object of the invention is to provide a system for energizing a plurality of torches from a single energizing circuit which provides arc starting voltage pulses.

A further object of the invention is to provide a system for energizing a plurality of torches from a single energizing circuit wherein the circuit is switched from one torch to another when no current flows.

A feature of the invention is the provision of a welding system including a plurality of torches and an energizing circuit providing pre-firing current to condition the system to produce a high voltage firing pulse, and which pre-firing current diverts current from a torch which is connected to terminate the arc thereat, with the circuit being switched from one torch to another during the time when no current is flowing to the torches.

Another feature of the invention is the provision of a system for energizing a plurality of torches from a single circuit wherein the torches are energized in sequence, and operating while each torch is energized to connect the next torch, so that an arc is initiated thereat when the next high voltage firing pulse is applied.

The invention is illustrated in the drawing wherein:
FIG. 1 is a schematic diagram of the system of the invention; and
FIG. 2 is a timing chart illustrating operation of the system.

In practicing the invention there is provided a welding system having a plurality of torches for making a plurality of spot welds in different positions on a work piece. The torches are connected by switching means, such as relays, to an energizing circuit which provides high voltage pulses for initiating or firing the arcs, and current to maintain the arcs. The circuit for producing the high voltage pulse includes a shunt rectifier circuit portion connected across the current supply for drawing pre-firing current therefrom. This is used in starting the arc, and it also serves to divert current from the arc to terminate the arc. As the times of starting and terminating the arc are precisely controlled, the duration of each arc is accurately determined. The connection of the energizing circuit to the torches is controlled by timing means which also controls the conduction of the shunt circuit and the triggering of the high voltage pulse. The connection of the torches is changed when no current flows to avoid arcing of the contacts. After one arc is established the next torch is connected but will not fire until a high voltage firing pulse is applied. The arc which is established at one torch will be terminated by conduction of the shunting circuit to divert current therefrom, and the connection to this torch will be broken after the arc is terminated.

Referring now to the drawing, in FIG. 1 there is illustrated a system including five welding torches 10, 11, 12, 13 and 14 for making spot welds on a work piece 15. The torches are energized from a constant current source 18 connected to the individual torches by contacts of relays 20, 21, 22, 23 and 24. Current is supplied from the source 18 through choke coil 27 and transformer winding 28 to the conductor 29, which is selectively connected through the relay contacts to the torches. In the drawing, relay 20 is shown energized so that torch 10 is connected to the current source.

In order to control the characteristics of the spot weld, it is necessary that the duration of the welding arc be accurately controlled. This requires that the arc be initiated and terminated at precise times. To do this a circuit may be provided which applies a high voltage pulse to the welding torch or electrode to initiate the arc. The circuit illustrated is in accordance with application Serial No. 227,481 filed October 1, 1962, and previously referred to. This circuit includes a silicon controlled rectifier 30 connected in series with resistor 31 across the current source, and in series with the choke 27. Conduction of the silicon controlled rectifier 30 is controlled bp timer 35, and this rectifier is rendered conducting to provide flow of current through the choke 27 before it is desired to initiate a welding arc.

To provide a high voltage pulse for initiating the welding arc, a tungsten electrode spark gap 40 is connected in series with capacitor 42, and the primary winding 41, which is coupled to secondary winding 28. The capacitor 42 is charged from current supplied by transformer 43 connected to the A.C. supply. This current is rectified by diodes 44 and 45, so that a voltage is developed across the capacitor 42. Switch 46 connected in series with resistor 47 is bridged across capacitor 42 to discharge the same for test purposes.

A trigger circuit is provided for causing conduction at the spark gap 40 and includes thyratron tube 50 having an output circuit including capacitor 51, the primary winding of transformer 52 and the silicon controlled rectifier 30. Capacitor 51 is charged by the circuit including transformer 53 connected to the A.C. supply, and rectifier 54, with resistor 55 bridging capacitor 51 to provide the desired charge time constant. The control grid of the thyratron 50 is connected to the timer 35 so that the thyratron is triggered at a predetermined time to cause the capacitor 51 to discharge into transformer 52. When capacitor 51 discharges, this diverts current from the silicon controlled rectifier 30 to cut it off. When silicon controlled rectifier 30 is cut off, the cut off of current in choke coil 27 produces a voltage pulse thereacross. The circuit including Zener diode 32 and resistor 33 prevents the transient across the choke coil from exceeding a particular value in case the welding arc is not established.

The secondary winding of transformer 52 is connected to capacitors 57 and 58. Capacitor 58 charges from the pulse produced in transformer 52 by discharge of capacitor 51. Capacitor 58 is connected to electrodes 60 and 61 of the tungsten spark gap 40, with electrodes 60 and 62 forming one spark gap, and electrodes 61 and 63 forming a second spark gap. The electrodes 60 and 62 are connected in a series circuit including capacitor 42 and the primary winding 41. This circuit is constructed to have low resistance, but the inductance of the winding 41 allows a small portion of the voltage rise of capacitor 58 to appear across electrodes 60 and 62, and the remainder across electrodes 61 and 63. The voltage across electrodes 61 and 63 produces an arc between them and suddenly drops to a low value. This causes the voltage across electrodes 60 and 62 to rise to a high value and produce an arc therebetween.

Capacitor 42 which has been charged from the A.C. source is therefore discharged through the arc between electrodes 60 and 62 and through the primary winding 41. The transformer including windings 41 and 28 has a ferrite core and provides voltage step-up so that the voltage pulse applied to the primary winding 41 may be stepped up by a large ratio, such as 100 to 1. This voltage pulse is added to the voltage pulse produced across choke coil 27 when the silicon rectifier 30 is cut off, to provide a very high voltage at conductor 29. This action is fully described in the application referred to above.

In order to provide current to the arc initiated by the high voltage pulse, a booster circuit is included. The booster circuit includes transformer 65, connected to the A.C. supply and connected to a coupling transformer 66 having a pair of primary windings to supply the required current. The secondary winding of coupling transformer 66 is connected through resistor 67 and rectifier 68 to capacitor 69, to charge this capacitor. Switch 70 in series with resistor 71 is provided to discharge capacitor 69 for test purposes. Capacitor 69 is connected through choke coil 73 and spark gap 74 to the conductor 29. When the high voltage pulse is applied to conductor 29, this causes spark gap 74 to break down so that the capacitor 69 discharges through choke coil 73 to provide current to the welding torch which is connected to conductor 29.

The relays 20 to 24 which act to connect the torches 10 to 14 to the conductor 29 are controlled by a multiple position switch, which may be a rotary or stepping switch 75. This includes an actuating mechanism 76, rotating arm 77 and two rows or levels of contacts. The switch is shown in a position at which the rotary arm provides connection from a positive supply 78 to contact 80, which is connected to relay 20. This energizes relay 20 to close the contacts thereof to connect torch 10 to conductor 29. When the arm 77 of the stepping switch moves to the next position, it will energize contacts 81 and 82. Contact 82 is bridged to contact 80 to hold the relay 20 energized. The switch contacts 80 and 82 may be arranged so that contact 82 is energized before contact 80 is disconnected, or the relay 20 may be slow to release, so that the relay does not fall out as the switch moves from one position to the next. At the second switch position, contact 81 is also energized and this connects the supply 78 to relay 21, so that both relays 20 and 21 will be energized.

It will be apparent from the connection of the relays to the switch contacts, that first one relay is energized (in the position shown only relay 20 is energized) and then this relay and the next relay are energized together. In the next position only the second relay will be energized, and in the following position the second and third relays will be energized. The actuating mechanism 76 of the switch 75 is connected to timer 35 so that the operation of the switch 76 is controlled in synchronism with the conduction of silicon controlled rectifier 30 and the triggering of the thyratron tube 50.

For an explanation of the timing of the sequence of operation, reference is made to FIG. 2. At the start of the operation it will be assumed that the silicon controlled rectifier 30 is non-conducting and the switch 75 is at the position immediately before the position shown in the drawing. The system is started at time $t1$ by firing the silicon controlled rectifier 30. Immediately thereafter the switch 75 is actuated so that the arm moves to the position shown, and this actuates relay 20. At time $t2$ controlled by timer 35, the thyratron 50 is triggered and this cuts off the silicon controlled rectifier 30 and fires an arc at the torch 10. As soon as the arc is established, the timer will actuate the switch 75 to cause it to step to the second position. As previously stated this holds relay 20 energized but also energizes relay 21.

The arc at torch 10 continues until silicon controlled rectifier 30 is again fired at time $t2$. As previously stated, the silicon controlled rectifier 30 shunts the output of the current source 18 to divert current from the arc at the torch 10. The current source is a constant current source and when current is diverted from the arc 10, the arc is starved to such a degree that it cannot continue. After the arc is terminated, the switch 75 will operate to move arm 77 to the next position wherein relay 20 is de-energized and only relay 21 is energized. Then at time $t4$ thyratron 50 will again be triggered to strike the arc at torch 11. Immediately following this, the switch 75 will be actuated to move to the next position to energize relay 22 while holding relay 21 energized. The silicon controlled rectifier 30 will again fire at time $t5$ to terminate the arc at torch 11.

This operation continues until arcs are produced in sequence at torches 12, 13 and 14. When the arc at torch 14 is terminated, the arm 77 of switch 75 will move from contact 83 to the next position at which no relays are actuated, to thereby terminate the sequence.

It is pointed out that the time intervals between times $t1$, $t2$, $t3$ etc. need not be uniform as shown in FIG. 2. The time interval between $t2$ and $t3$, $t4$ and $t5$, etc. control the duration of the welding arcs at the torches 10, 11 etc. These times may be the same, or different, for the different torches to provide the desired welding conditions. Different times may be required in the event that the thickness of the work piece is greater at one spot than at another, for example.

The system described has been found to be highly satisfactory for energizing a plurality of spot welding torches from a single energizing circuit. The circuit which provides the firing pulse to initiate the arc also terminates the arc by diverting current from the arc to starve the arc so that it cannot continue. The different torches are connected to the circuit and disconnected therefrom at times when no current is supplied to the torches so there is no problem of burning contacts by either making or breaking the circuit when heavy current flows.

I claim:

1. A welding system including in combination, a plurality of welding torches, an energizing circuit including output terminals and arc starting means providing pulses at said output terminals, said arc starting means including a shunt circuit portion selectively rendered conducting for diverting current from said output terminals, a plurality of switch means for individually connecting said torches to said output terminals, and timing means for controlling said energizing circuit and for actuating said switch means, said timing means including first, second and third portions, said first portion being coupled to said shunt circuit portion and acting to render the same conductive to provide pre-firing current, said second portion being coupled to said switch means and actuating one of said switch means to connect one of said torches to said output terminals, said third portion being coupled to said energizing circuit for actuating the same to produce said arc firing pulse to initiate an arc at said one torch, said second portion of said timing means operating after the arc is initiated to actuate the second switch means for connecting a second torch to the energizing circuit, said first portion of said timing means operating at a predetermined time after operation of said third portion thereof to render said shunt circuit portion conducting to divert current from said output terminals and terminate the arc at said one torch, said second portion of said timing means operating to release said one switch means and disconnect said one torch after said arc is terminated, and said third portion of said timing means operating after release of said one switch means to provide a voltage pulse to initiate an arc at said second torch.

2. A welding system including in combination, a plurality of welding torches, an energizing circuit including output terminals and arc starting means providing an arc firing voltage at said output terminals, said arc starting means including a portion selectively operated for reducing the current at said output terminals, switch means including a plurality of portions for individually connecting said torches to said output terminals, and timing means for controlling said energizing circuit and for actuating said switch means, said timing means including first, second and third portions, said first portion being coupled to said switch means and actuating one of said portions thereof to connect one of said torches to said output terminals, said second portion being coupled to said energizing circuit for actuating the same to produce said arc firing voltage to initiate an arc at said one torch, said third portion of said timing means being coupled to said arc starting means and operating at a predetermined time after operation of said second portion to actuate said portion of said arc starting means to reduce the current at said output terminals and terminate the arc at said one torch, said first portion of said timing means operating to release said one portion of said switch means and disconnect said one torch after said arc is terminated, and said portions of said timing means operating to actuate said switch means and said arc starting means to connect said torches to said output terminals in turn to initiate and terminate arcs at said torches at predetermined times.

3. A welding system including in combination, a plurality of welding torches, an energizing circuit including output terminals, discharge means for providing a pulse of high voltage at said output terminals, and a shunt circuit portion selectively rendered conducting for diverting current from said output terminals and cooperating with said discharge means for producing a high voltage pulse, switch means including a plurality of portions for individually connecting said torches to said output terminals, and timing means for controlling said energizing circuit and for actuating said switch means, said timing means including first, second and third portions, said first portion being coupled to said shunt circuit portion and acting to render the same conductive, said second portion being coupled to said switch means and actuating one portion thereof to connect one of said torches to said output terminals, said third portion being coupled to said energizing circuit and causing operation of the same after said switch means is actuated to render said shunt circuit portion non-conducting and to produce said pulse of voltage to initiate an arc at said one torch, said first portion of said timing means operating at a predetermined time after operation of said third portion thereof to render said shunt circuit portion conducting to divert current from said output terminals and terminate the arc at said one torch, and said second portion of said timing means operating to release said one portion of said switch means after said arc is terminated.

4. A welding system including in combination, a plurality of welding torches, an energizing circuit including output terminals and arc starting means providing an arc firing voltage at said output terminals, said arc starting means including a portion selectively operated for diverting current from said output terminals, switch means including a plurality of portions for individually connecting said torches to said output terminals, and timing means for controlling said energizing circuit and for actuating said switch means, said timing means including first, second and third portions, said first portion being coupled to said switch means and actuating one portion thereof to connect one of said torches to said output terminals, said second portion being coupled to said energizing circuit for actuating the same to produce said arc firing voltage to initiate an arc at said one torch, said first portion of said timing means operating after the arc is initiated to actuate the second portion of said switch means for connecting a second torch to the energizing circuit, said third portion of said timing means operating at a predetermined time after operation of said second portion thereof to actuate said portion of said arc starting means to divert current from said output terminals and terminate the arc at said torch connected by said one switch portion, said first portion of said timing means operating to release said one portion of said switch means and disconnect said one torch after said arc is terminated, and said second portion of said timing means operating after release of said one portion of said switch means to provide a voltage pulse to initiate an arc at said second torch.

5. A welding system including in combination, a plurality of welding torches, an energizing circuit including output terminals, discharge means for providing a pulse of high voltage at said output terminals, and a shunt circuit portion selectively rendered conducting for diverting current from said output terminals and cooperating with said discharge means for producing a high voltage pulse, a plurality of switch means for individually connecting said torches to said output terminals, and timing means for controlling said energizing circuit and for actuating said switch means, said timing means including first, second and third portions, said first portion being coupled to said shunt circuit portion and acting to render the same conductive, said second portion being coupled to said switch means and actuating one of said switch means to connect one of said torches to said output terminals, said third portion being coupled to said energizing circuit and causing operation of the same after said one switch means is actuated to render said shunt circuit portion non-conducting and to produce said pulse of voltage to initiate an arc at said one torch, said second portion of said timing means operating after the arc is initiated to actuate a second switch means for connecting a second torch to the energizing circuit, said first portion of said timing means operating at a predetermined time after operation of said third portion thereof to render said shunt circuit portion conducting to divert current from said output terminals and terminate the arc at said one torch, said second portion of said timing means operating to release said one switch means after said arc is terminated, and said third portion of said timing means operating after release of said one switch means to provide a voltatge pulse to initiate an arc at said second torch.

6. A welding system including in combination, a plurality of welding torches, an energizing circuit including output terminals and arc starting means providing an arc firing voltage at said output terminals, said arc starting means including a portion selectively operated for diverting current from said output terminals, a plurality of relays having contacts for individually connecting said torches to said output terminals, switch means for selectivley energizing said relays, and timing means for controlling said energizing circuit and for actuating said switch means, said timing means including first, second and third portions, said first portion being coupled to said switch means for operating the same to energize one of said relays to connect one of said torches to said output terminals, said second portion being coupled to said energizing circuit for actuating the same to produce said arc firing voltage to initiate an arc at said one torch, said first portion of said timing means operating after the arc is initiated to again operate said switch means to energize a second relay for connecting a second torch to the energizing circuit, said third portion of said timing means operating at a predetermined time after operation of said second portion thereof to actuate said portion of said arc starting means to divert current from said output terminals and terminate the arc at said one torch, said first portion of said timing means operating after said arc is terminated, to further operate said switch means to release said one relay and disconnect said one torch, and said second portion of said timing means operating after release of said one relay to provide a voltage pulse to initiate an arc at said second torch.

7. A welding system including in combination, a plurality of welding torches, an energizing circuit including output terminals and arc starting means providing an arc firing voltage at said output terminals, said arc starting means including a portion selectively operated for diverting current from said output terminals, a plurality of relays having contacts for individually connecting said torches to said output terminals, a multiple position switch coupled to said relays for selectively energizing said relays in sequence, said switch having a first position for energizing one of said relays to connect one torch alone, a second position to energize the first and second relays to connect both said one torch and the second torch, a third position to energize only said second relay so that said one relay is released and said second torch is connected alone, and additional positions for energizing the next relay while a given relay is still energized, and for then releasing the given relay so that each relay is energized alone for connecting each torch alone, and timing means for controlling said energizing circuit and for causing operation of said switch, said timing means including first, second and third portions, said first portion being coupled to said switch and operating the same to said first position to connect said one torch to said output terminals, said second portion being coupled to said energizing circuit for actuating the same to produce said arc firing voltage to initiate an arc at said one torch, said first portion of said timing means operating after the arc is initiated to operate said switch to said second position for connecting said second torch to the energizing circuit, said third portion of said timing means operating at a predetermined time after operation of said second portion thereof to actuate said portion of said arc starting means to divert current from said output terminals and terminate the arc at said one torch, said first portion of said timing means operating after said arc is terminated to operate said switch to said third position for disconnecting said one torch, said second portion of said timing means operating after one torch is disconnected to provide a voltage pulse to initiate an arc at said second torch, with said timing means operating to initiate the arc at each torch when it is connected alone, and to terminate such arc after a predetermined time interval.

8. A welding system including in combination, a plurality of welding torches, an energizing circuit including output terminals and arc starting means providing an arc firing voltage at said output terminals, said arc starting means including a portion selectively operated for diverting current from said output terminals, a plurality of relays having contacts for individually connecting said torches to said output terminals, a stepping switch coupled to said relays for selectively energizing said relays in sequence, said switch having two levels of contacts with each relay connected to at least one contact of each level so that at alternate positions of said switch one of said relays is energized alone and then two relays are energized together, to alternately connect two of said torches to said output terminals and then connect each torch alone, and timing means for controlling said energizing circuit and for causing operation of said stepping switch, said timing means including first, second and third portions, said first portion being coupled to said stepping switch and operating the same to a first position to connect one of said torches to said output terminals, said second portion being coupled to said energizing circuit for actuating the same to produce said arc firing voltage to initiate an arc at said one torch, said first portion of said timing means operating after the arc is initiated to operate said stepping switch to a second position for connecting said one torch and a second torch to the energizing circuit, said third portion of said timing means operating at a predetermined time after operation of said second portion thereof to actuate said portion of said arc starting means to divert current from said output terminals and terminate the arc at said one torch, said first portion of said timing means operating after said arc is terminated to operate said stepping switch to a third position for disconnecting said one torch, said second portion of said timing means operating after said one torch is disconnected to provide a voltage pulse to initiate an arc at said second torch, with said timing means operating to initiate the arc at each torch when it is connected alone, and to terminate such arc after a predetermined time interval.

References Cited by the Examiner

UNITED STATES PATENTS

| 1,183,195 | 5/1916 | Heany | 219—115 |
| 2,798,937 | 7/1957 | Miller | 219—131 |
| 2,881,334 | 4/1959 | Praeg | 219—115 X |
| 3,154,721 | 10/1964 | Sommeria | 219—131 X |

JOSEPH V. TRUHE, *Primary Examiner.*